(12) United States Patent
Agrawal et al.

(10) Patent No.: US 11,379,865 B2
(45) Date of Patent: Jul. 5, 2022

(54) MACHINE LEARNED MODELS FOR ITEM PRICE PLANNING

(71) Applicant: SAP SE, Walldorf (DE)

(72) Inventors: Rajat Agrawal, Houston, TX (US); Uday Guntupalli, Naugatuck, CT (US)

(73) Assignee: SAP SE, Walldorf (DE)

( * ) Notice: Subject to any disclaimer, the term of this patent is extended or adjusted under 35 U.S.C. 154(b) by 7 days.

(21) Appl. No.: 17/081,747

(22) Filed: Oct. 27, 2020

(65) Prior Publication Data
US 2022/0020043 A1    Jan. 20, 2022

Related U.S. Application Data

(60) Provisional application No. 63/053,406, filed on Jul. 17, 2020.

(51) Int. Cl.
*G06Q 30/02*       (2012.01)
*G06Q 10/06*       (2012.01)
*G06N 20/00*       (2019.01)
*G06Q 30/00*       (2012.01)
*G06Q 10/04*       (2012.01)
*G06Q 50/02*       (2012.01)
*G06Q 50/28*       (2012.01)

(52) U.S. Cl.
CPC ......... *G06Q 30/0206* (2013.01); *G06N 20/00* (2019.01); *G06Q 10/04* (2013.01); *G06Q 10/06315* (2013.01); *G06Q 30/018* (2013.01); *G06Q 30/0205* (2013.01); *G06Q 50/02* (2013.01); *G06Q 50/28* (2013.01)

(58) Field of Classification Search
None
See application file for complete search history.

(56) References Cited

U.S. PATENT DOCUMENTS

| 10,796,279 B1 * | 10/2020 | Kim ..................... G06Q 10/087 |
| 10,984,433 B1 * | 4/2021 | Doner ..................... G06N 7/005 |
| 2002/0103688 A1 * | 8/2002 | Schneider ........ G06Q 10/06375 705/7.28 |
| 2003/0195822 A1 | 10/2003 | Tatge et al. |

(Continued)

FOREIGN PATENT DOCUMENTS

| CN | 107369049 A | 11/2017 |
| WO | WO-2019032648 A1 | 2/2019 |

OTHER PUBLICATIONS

Arthur, M., "Simple Soybean Price Regression with Fast.ai Random Forests," Jan. 22, 2019, Towards Data Science (Year: 2019).*

(Continued)

*Primary Examiner* — Brian M Epstein
*Assistant Examiner* — Sara Grace Brown
(74) *Attorney, Agent, or Firm* — Schwegman Lundberg & Woessner, P.A.

(57) ABSTRACT

In an example embodiment, multiple machine learned models are used to continually learn from data to update various prediction models. Prediction of item prices, at the production and distribution point level, and utilizing this information along with other item information, such as crop yield, operational cost, and storage cost in the case of arming, may be used to solve the long- and short-term planning problems of farmers and help in decision making based on daily and the most up-to-date forecasts.

20 Claims, 10 Drawing Sheets

(56) References Cited

U.S. PATENT DOCUMENTS

| | | | |
|---|---|---|---|
| 2005/0228738 A1 | 10/2005 | Harris | |
| 2014/0116341 A1* | 5/2014 | Kopic | A01K 29/00 |
| | | | 119/14.02 |
| 2015/0088783 A1* | 3/2015 | Mun | G06Q 40/08 |
| | | | 705/36 R |
| 2019/0130425 A1* | 5/2019 | Lei | G06N 20/00 |
| 2019/0325466 A1 | 10/2019 | Perry et al. | |
| 2019/0325534 A1* | 10/2019 | Perry | G06Q 30/0283 |
| 2020/0074402 A1* | 3/2020 | Adato | G06K 9/00771 |
| 2020/0272971 A1* | 8/2020 | Ruff | G06Q 10/06313 |
| 2020/0302455 A1* | 9/2020 | Arroyo | G06N 20/00 |
| 2020/0394533 A1* | 12/2020 | Ramalingam | G06N 5/04 |
| 2021/0089944 A1* | 3/2021 | Zhou | G06Q 10/04 |
| 2021/0103945 A1* | 4/2021 | Montero | G06Q 30/0206 |
| 2021/0209490 A1* | 7/2021 | Casas | G06N 5/04 |
| 2021/0241391 A1* | 8/2021 | Carroll | G06Q 30/02 |

OTHER PUBLICATIONS

Ribeiro, Matheus Henrique Dal Molin, et al. "Multi-objective ensemble model for short-term price forecasting in corn price time series." 2019 International Joint Conference on Neural Networks (IJCNN). IEEE. (Year: 2019).*

Neema, Varun, et al., "Agriculture Commodity Price Forecasting using MI Techniques", International Journal of Innovative Technology and Exploring Engineering (IJITEE) vol. 9 Issue-2S, (Dec. 2019), 729-732.

Shastry, Aditya, et al., "Prediction of Crop Yield Using Regression Techniques", International Journal of Soft Computing 12(2), (2017), 96-102.

Xiong, Tao, et al., "A combination method for interval forecasting of agricultural commodity futures prices", Knowledge-Based Systems 77, (2015), 92-102.

* cited by examiner

| CROP NAME | ELEVATOR ADDRESS | BEST SALE DATE | FUTURES PRICE | BASIS PRICE | INPUT COST | STORAGE COST | TOTAL QUANTITY | CROP EARNING |
|---|---|---|---|---|---|---|---|---|
| <CROP 1> | <ADDRESS 1> | <DATES 1> | <PRICE 1> | <BASIS 1> | <COST 1> | <STOR. COST 1> | <YIELD 1> | <INCOME IN USD> |
| <CROP 2> | <ADDRESS 2> | <DATES 2> | <PRICE 2> | <BASIS 2> | <COST 2> | <STOR. COST 2> | <YIELD 2> | <INCOME IN USD> |
| ... | ... | ... | ... | ... | ... | ... | ... | ... |
| <CROP N> | <ADDRESS N> | <DATES N> | <PRICE N> | <BASIS N> | <COST N> | <STOR. COST N> | <YIELD N> | <INCOME IN USD> |

*FIG. 8*

MACHINE LEARNED MODELS FOR ITEM PRICE PLANNING

CROSS-REFERENCE TO RELATED APPLICATIONS

This application claims the benefit of U.S. Provisional Application No. 63/053,406, filed Jul. 17, 2020, entitled "MACHINE LEARNED MODELS FOR CROP PLANNING," which is incorporated herein by reference in its entirety.

TECHNICAL FIELD

This document generally relates to machine learning. More specifically, this document relates to machine learned models for item price planning.

BACKGROUND

The production and distribution of certain types of items are very important to the operation of a country. For example, farming plays a vital role in the economy, and costs and overhead related to growing crops can be a significant drag on the farming sector specifically. The success of farmers drives the agricultural industry and provides food security and nourishment to individuals across the globe.

Success in farming is typically measured in terms of production (yield per acre) and the price received from the crop sale. A good crop rotation plan is critical in maximizing yield per acre. A typical crop rotation plan identifies crops to plant several years out into the future, but is carried out without any visibility into future market prices for those crops.

BRIEF DESCRIPTION OF DRAWINGS

The present disclosure is illustrated by way of example and not limitation in the figures of the accompanying drawings, in which like references indicate similar elements.

FIG. 8 is a screen capture illustrating an example output screen in accordance with an example embodiment.

DETAILED DESCRIPTION

Figure 1:
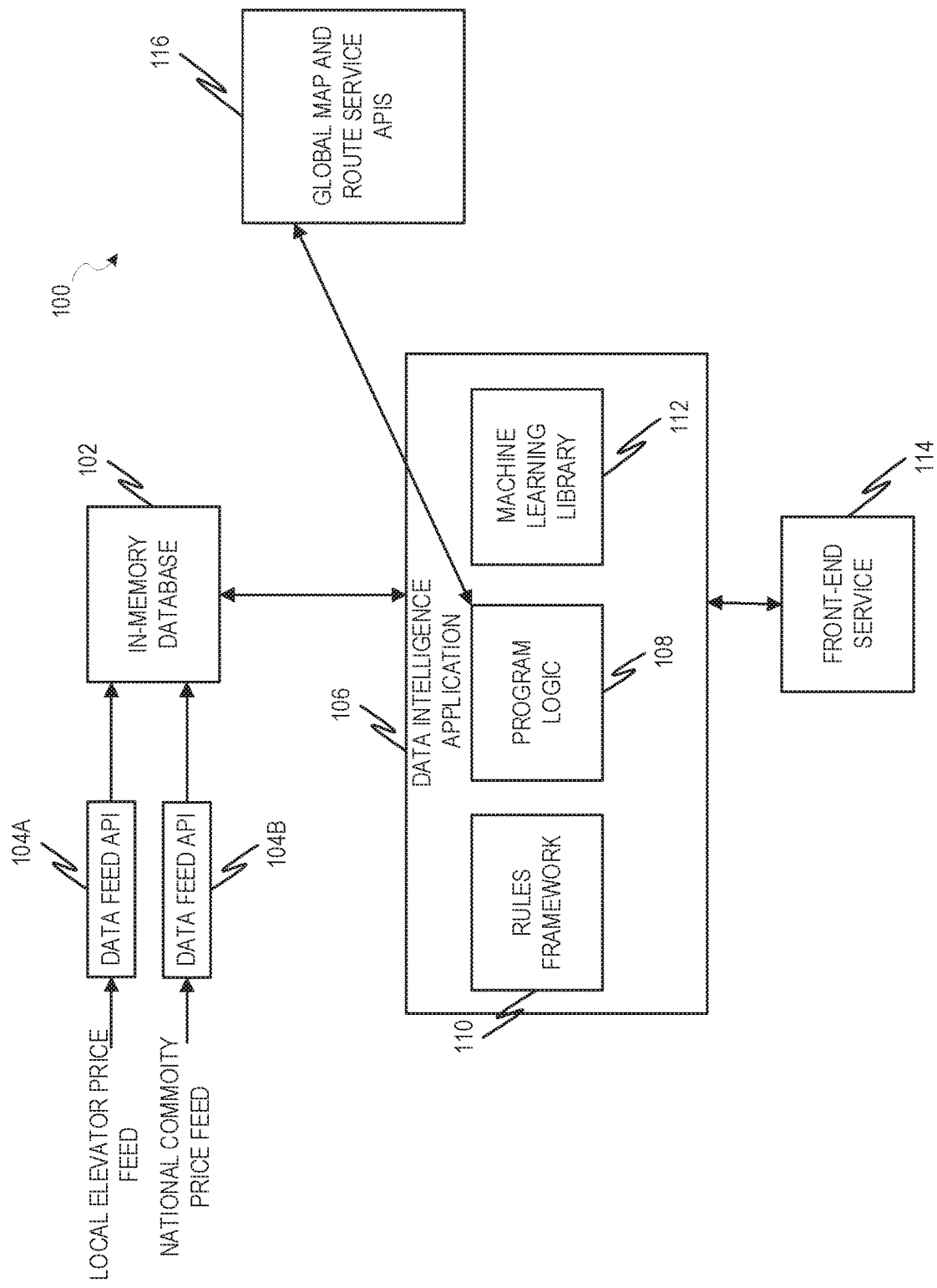
FIG. 1 is a block diagram illustrating a system in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

The present disclosure describes the use of machine learning to aid in the prediction of item costs and item-related costs. The present disclosure will describe the functionality primarily using the example of crop planning and farming. Nothing in this disclosure, however, shall be read as limiting the scope of coverage to only the crop planning and farming environments, as generally the same techniques can be applied to many different types of items. Examples of items other than crop commodities would include items transacted in bulk, such as the production of crude oil or a gasoline terminal.

With respect to farming, typically a farmer reviews the crop rotation plan prior to each planting season, in terms of the weather forecast, input cost, soil situation, and current market price. This review may result in a re-evaluation of the crop rotation plan.

When the crop is ready to be harvested, the farmer then typically reviews the current market situation again to decide a sale date for the harvest, in order to maximize farm income. The decision could be to, for example, delay crop sale and keep it in storage until price can be maximized.

Many crops, such as grain and oilseeds, have quite volatile prices. The commodity price may change on a daily basis. With farmers needing to make decisions ranging from long term planning (crop rotation), planning at the beginning of each seeding season, deciding whether to sell in advance of harvest by locking in price, selling at harvest, or storing (some or all of) the commodity, there is a need to help farmers make these decisions based on forecasted crop procurement price at nearby grain elevator(s).

While machine learning has been applied to the forecasting of commodity prices, prior art models are designed for commodity traders, and not for farmers, and thus fail to capture nuances required to make accurate predictions for crop planning. Elevators are businesses that purchase crops from farmers, and can essentially be thought of as wholesale distributors of the crops. In the non-farming embodiments, the equivalent would be a distribution point, such as a fuel terminal. The general commodity price predicted by prior art models may be forecast at the national level, and may not account for location-based or other personalized nuances specific to individual elevators in proximity to a farmer's land. Basis price history, however, may not be available for many elevators.

In an example embodiment, multiple machine learned models are used to continually learn from data to update various prediction models. Prediction of agricultural commodity prices, at the crop and farm level, and utilizing this information along with crop yield, operational cost, and storage cost, may be used to solve the long- and short-term planning problems of farmers and help in decision making based on daily and the most up-to-date forecasts.

FIG. 1 is a block diagram illustrating a system 100 in accordance with an example embodiment. The system 100 may include an in-memory database 102. An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. One example of an in-memory database is the HANA® database from SAP SE, of Walldorf, Germany. The in-memory database 102 may store data in one or more application tables. In an example embodiment, data feed application program interfaces (APIs) 104A, 104B connect the in-memory database 102 to external databases with historical and current pricing information. For example, API 104A may connect the in-memory database 102 to a price feed regarding local elevator basis prices for each crop procured and stored at the elevator, while API 104B may connect the in-memory database 102 to a national commodity prices (such as publicly traded derivatives, such as futures contract, with respect to various grains and oilseeds). This information may then be stored in the in-memory database 102. It should be noted that in one example embodiment, the in-memory database 102 is operated in the cloud.

A data intelligence application 106 may include program logic 108, which may implement rules obtained from a rules framework 110 and machine learned models from a machine learning library 112 to provide price predictions of commodity based on the information stored in the in-memory database 102. As will be described in more detail below, the program logic 108 may train some of the machine learned models in the machine learning library 112 as well as utilize those models, in addition to utilizing models trained by other components, possibly even on external sources.

Also depicted is a front-end service 114, which utilizes the commodity price predictions in one or more practical ways depending upon the software environment. For example, the front-end service 114 may be a tool that allows a user, such as a farmer, to enter a crop rotation plan and be provided with a list of projected prices (and earnings) for a number of different crops and/or elevators. Alternatively, the front-end service 114 may be a tool that allows the user to enter (either directly or indirectly), a crop and a desired sell date, and then provides this information to the program logic 108, which returns predicted prices for elevators in proximity to the user's farm on the desired sell date. To that end, one or more global map and route service APIs 116 may interact with the program logic 108 to aid in determining nearby grain elevators.

Figure 2:
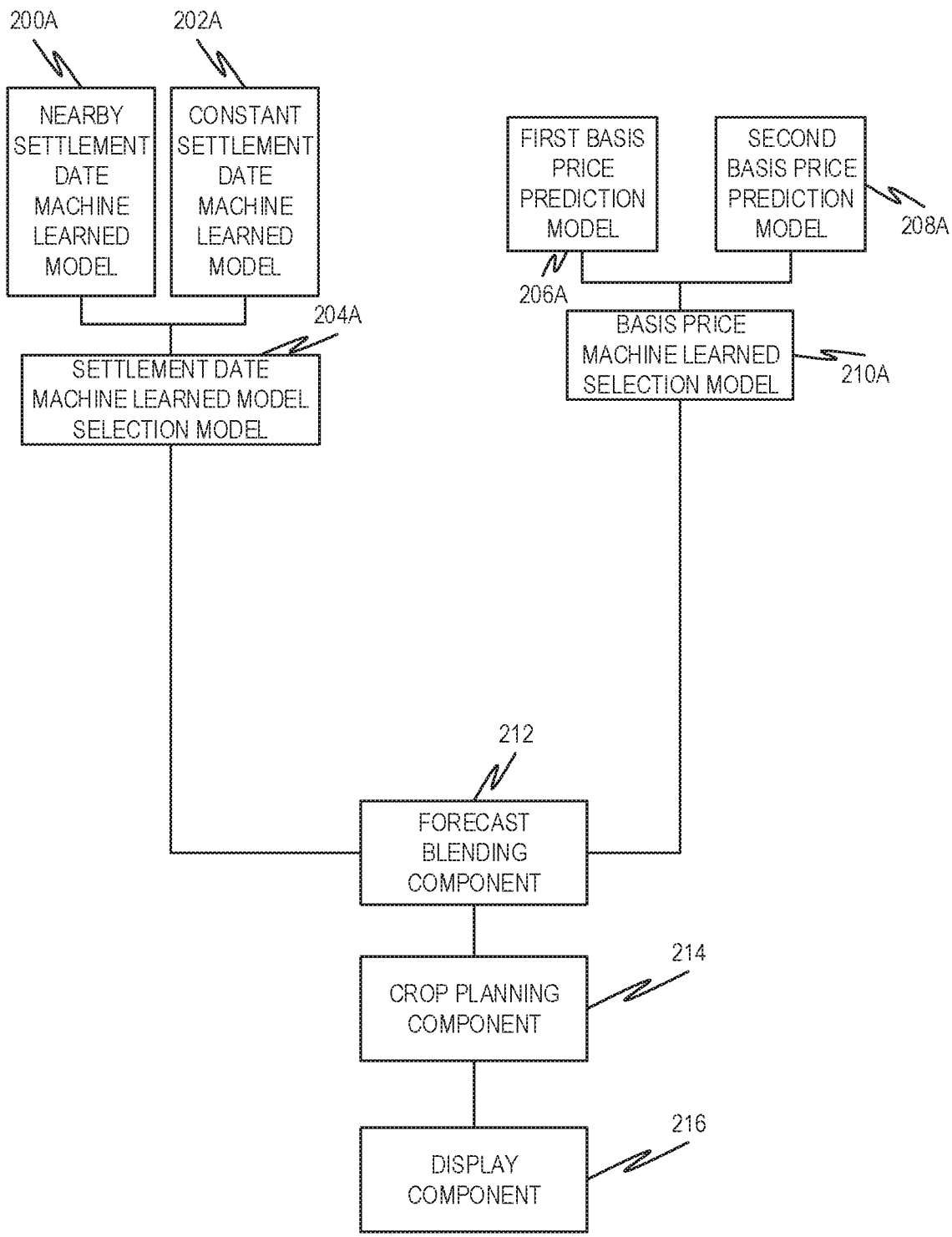
FIG. 2 is a block diagram illustrating a program logic in accordance with an example embodiment.

FIG. 2 is a block diagram illustrating the program logic 108 in accordance with an example embodiment. Here, the logic 108 includes, for agricultural commodity, two separate models for forecasting the commodity prices at a national level. A nearby settlement date machine learned model 200A builds continuous historical data for each pricing date by reading the pricing from the first nearby settlement date. A settlement date is the date the future contract on a trading exchange is settled. Since the trading happens only on workdays, any gaps that exist in pricing data due to weekends or holidays may be filled by taking the next working day price if the day in question is a Sunday and the prior working day price if it is anything other than a Sunday (e.g., if it is a Saturday, or a holiday that falls on a Wednesday). A constant settlement date machine learned model 202A, however, keeps the settlement date constant (as per first nearby date for each forecast date), although pricing gaps are still filled based on the rules outlined above with respect to the nearby settlement date machine learned model 200A. The result is that the constant settlement date machine learned model 202A provides more continuity by keeping the settlement date constant, and thus provides a smooth baseline for projecting forecasts, but the underlying price information may not be as strong as the nearby settlement date machine learned model 200A.

Since there are certain circumstances in which the nearby settlement date machine learned model 200A will perform better and other circumstances where the constant settlement date machine learned model 202A will perform better, in an example embodiment a settlement date machine learned model selection model 204A will select the results of one of these two models based on the current circumstances. Root mean square error is determined for each of the models to define the best model based on data trend and seasonality. It should be noted that while root mean square error is one factor, it need not be the only factor, and in an example embodiment, the settlement date machine learned model selection model 204A is itself a trained model that may use factors such as mean percentage error and the historical trend of a winning model between the nearby settlement date machine learned model 200A and the constant settlement date machine learned model 202A. In case there is a difference in this trend while the root mean square error difference is small (e.g., within a preset amount), the trend may be followed. The root mean square error scores for each model 200A, 202A may be stored in the application tables of the in-memory database to keep a record and establish the trend.

The output of the settlement date machine learned model selection model 204A is a forecast time series (from the appropriate model) of the national commodity prices. These forecasts may project into the future a certain amount, e.g., up to 180 days.

The basis price forecast should also be determined. Local purchase price at the commodity elevator is different than the ongoing derivative national market price and is influenced by basis. Local crop price minus the derivative market price is the basis. Basis can be either positive or negative.

In an example embodiment, a mechanism is built to store the prevailing basis price in the application tables along with elevator addresses to build a basis price history nationally. A process that will be termed Robotic Basis Price Automation can be used to extract and store basis prices for elevators from online publications, or corresponding APIs may be used where available. Robotic Basis Price Automation process may leverage SAP artificial intelligence business services e.g. SAP Document Information Extraction to extract basis price information from online publications or elevator websites coupled with another machine learning service e.g. SAP Intelligent Robotic Process Automation to automate this process and execute in a periodic manner.

A first basis price prediction machine learned model 206A for each commodity may be used to forecast the basis price of the corresponding commodity based on available basis price history for each elevator. The first basis price prediction machine learned model 206A is trained using historical data to create a model based on data trend and seasonality.

A second basis price prediction machine learned model 208A for each commodity may be used to forecast the basis price of the corresponding commodity at a specific elevator based on a weighted average of all "nearby" elevators. The weighted average is based on the proximity of the nearby elevators, with the nearest elevator carrying the highest weight. The nearby range is a function of parameters, such as geographic distance, that allow for a minimum number of elevators or elevators based on a maximum radius to drive. This may be important for elevators for which basis price history is not available. It additionally serves as an alternative way to forecast basis on elevators that have historical prices available but during certain periods of time the basis price has been an outlier. An example of such a scenario is the following: to meet an export obligation at a New Orleans elevator to export a particular commodity at a particular volume, the price at an interior elevator, which supplies the commodity to the New Orleans elevator, is made favorable as an outlier until the desired volume has been received. After that, the price returns to normal. The incorporation of nearby elevators in the second basis price prediction machine learned model 208A helps protect from such scenarios ruining the accuracy of the model.

Since there are certain circumstances in which the first basis price prediction machine learned model 206A will perform better and other circumstances where the second basis price prediction machine learned model 208A will perform better, in an example embodiment a basis price machine learned model selection model 210A will select the results of one of these two models based on the current circumstances. Root mean square error is determined for each of the models to define the best model based on data trend and seasonality. It should be noted that while root mean square error is one factor, it need not be the only factor, and in an example embodiment, the basis price machine learned model selection model 210A is itself a trained machine learned model that may use factors such as mean percentage error and the historical trend of a winning model between the first basis price prediction machine learned model 206A and the second basis price prediction machine learned model 208A. In case there is a difference in this trend while the root mean square error difference is small (e.g., within a preset amount), the trend may be followed. The root mean square error scores for each model 206A, 208A, may be stored in the application tables of the in-memory database to keep a record and establish the trend.

A forecast blending component 212 may then blend the forecasts from the settlement date machine learned model selection model 204A the basis price machine learned model selection model 210A along with the storage costs as per each forecast date for each commodity. For a flat storage rate, the total storage cost for each date range in the time series is calculated using the following formula: Storage Cost=(Forecast Date−Harvest Date)*Total Yield*Storage Rate. The storage rate can be stipulated in different ways, e.g. tiered graduated scale storage rate based on quantity and accordingly the calculation formula will be different. Storage information may be used for sale date determination but may not, in some example embodiments, be used for crop rotation planning and crop pre-planting planning.

For each date in the time series, the forecast blending component 212 combines the forecast commodity price, the forecast basis price, the input cost, and the storage cost as follows:

Crop Earning=Forecast Commodity Price+Forecast Basis Price−Input Cost−Storage Cost.

The input cost and storage rate may be received from user entry. The result is a crop earning forecast for each date. Input cost represents total dollar value of all the inputs to grow a specific crop. This may include seed, fertilizer, labor, machinery, freight cost to transport the harvest to elevator etc. Storage rate represents how much is charged for grain storage. Storage rate may be flat, volume based on tiered graduated scale etc.

In some example embodiments, if crop rotation planning is performed, a crop planning component 214 then obtains a crop earning forecast from the forecast blending component 212 for each of a plurality of different crops, thus obtaining, for example, a price forecast for many different crops the farmer is considering planting.

A display component 216 then carries out the final decision making as to how to present results to the user. For crop rotation planning, for example, the crop earning forecasts from the crop planning component 214 and a sale date are obtained, and an expected crop income is presented to the user. As per a rules framework, a date range may also be presented around the harvest date specified by the farmer to indicate movement in forecasted income.

For "crop pre-planting planning" model, for example, display component 216 receives crop earning forecast from forecast blending component 212. As per a rules framework, a date range may also be presented around the requested harvest/sale date to indicate movement in forecasted income. Farmer can use this information to decide if it is advantageous to sell the crop prior to harvest, to lock in a better price, or to wait until the crop is ready.

For "best sale date planning at harvest" an additional parameter is storage rate. The crop earning forecast received from forecast blending component 212 is reviewed by display component 216 to identify specific date(s) when the crop income is highest. The output of this model along with rules framework is to present the date range in which the best crop income is expected. This will help the farmer decide how long the crop should be kept in storage.

For "best sale date planning post-harvest", display component 216 receives earning forecast timeseries from forecast blending component 212. It identifies date range along with rules framework when the crop income is highest and presents it to the user. In this scenario input cost from the farmer should be inclusive of storage rate incurred thus far to allow this invention to present the true crop income.

Figure 3:
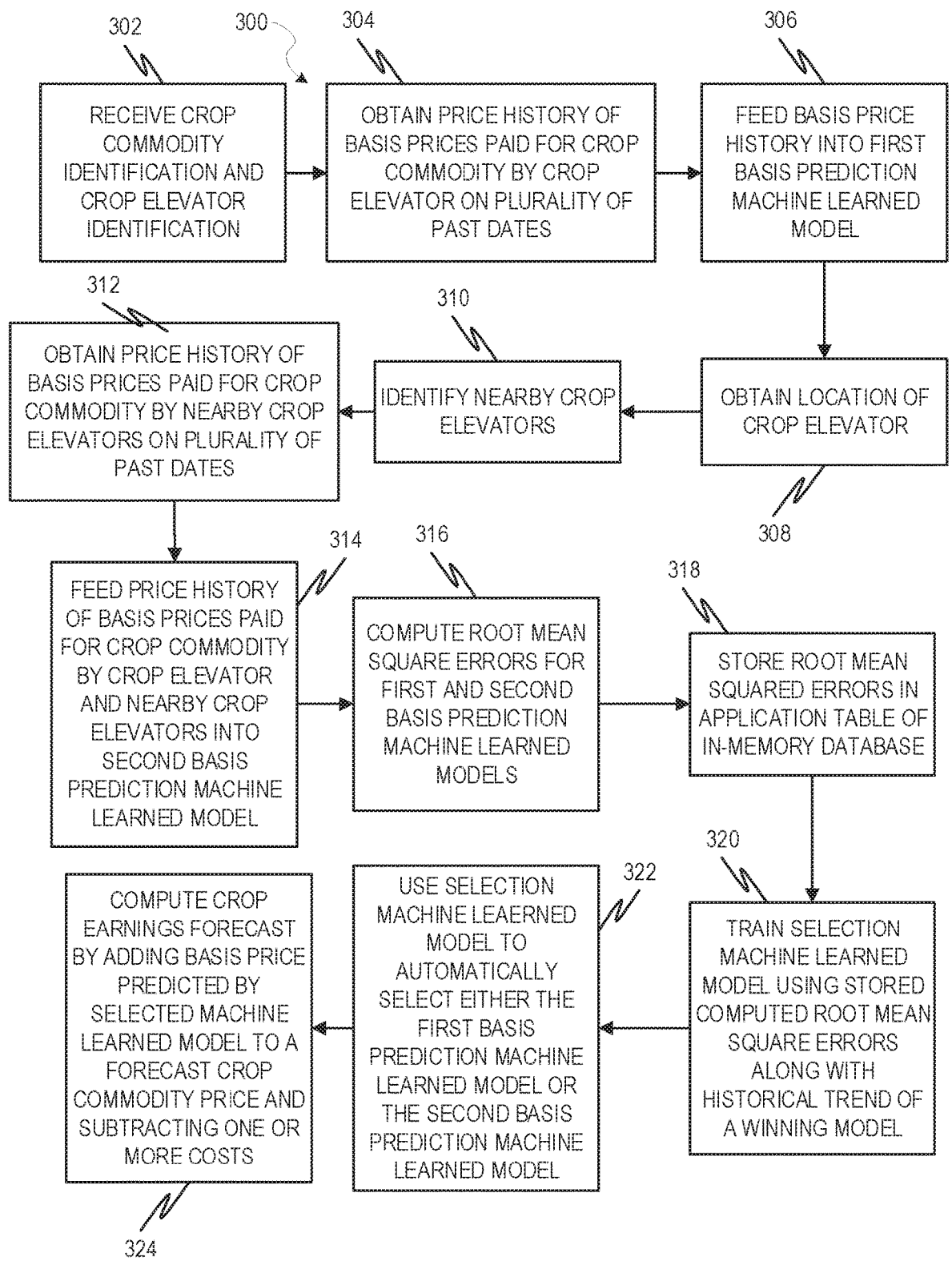
FIG. 3 is a flow diagram illustrating a method for training and using machine learned models in accordance with an example embodiment.

FIG. 3 is a flow diagram illustrating a method 300 for training and using machine learned models in accordance with an example embodiment. At operation 302, an identification of a crop commodity and an identification of a crop elevator corresponding to the crop commodity are received from a graphical user interface or global map and route service API. At operation 304, price history of basis prices paid for the crop commodity by the crop elevator on a plurality of past dates are obtained. At operation 306, the price history is fed into a first basis prediction machine learned model trained to forecast a basis price for a plurality of future dates based upon the price history. At operation 308, a location of a crop elevator is obtained. At operation 310, one or more crop elevators nearby the crop elevator are identified, based on criteria maintained by a rules framework. This criterion may include, for example, strict geographic distance ("as the crow flies"), road travel distance (between two locations using roads), or travel time. There may be a secondary criterion on minimum number of elevators to be selected, which may result in increase in proximity definition until a minimum number of elevators are identified.

At operation 312, price history of basis prices paid for the crop commodity by the one or more crop elevators nearby the crop elevator is obtained. At operation 314, the basis price history for the crop elevator and the price history of basis prices paid for the crop commodity by the one or more crop elevators nearby the crop elevator are fed to a second basis prediction machine learned model trained to forecast the basis price for the plurality of future dates. At operation 316, a root mean square error for the first basis prediction machine learned model and the second basis prediction machine learned model are computed. It should be noted that while root mean square error is one factor, it need not be the only factor and other factors such as mean percentage error can also be used. At operation 318, these root mean square errors are stored in an application table of an in-memory database. At operation 320, a selection machine learned model is trained using the stored computed root mean square errors and/or other computed error factors along with the historical trend of a winning model between the first basis price prediction machine learned model and the second basis price prediction machine learned model. At operation 322, the selection machine learned model is used to automatically select either the first basis prediction machine learned model or the second basis prediction machine learned model. In case the root mean square error difference is small (e.g., within a preset amount) and it is leading to a difference in established trend, the trend may be followed. The root mean square error scores for each model that are stored in operation 318 help in establishing a trend. At operation 324, a crop earnings forecast is computed by adding the basis price predicted by the selected machine learned model to a forecast crop commodity price and subtracting one or more costs.

Figure 4:
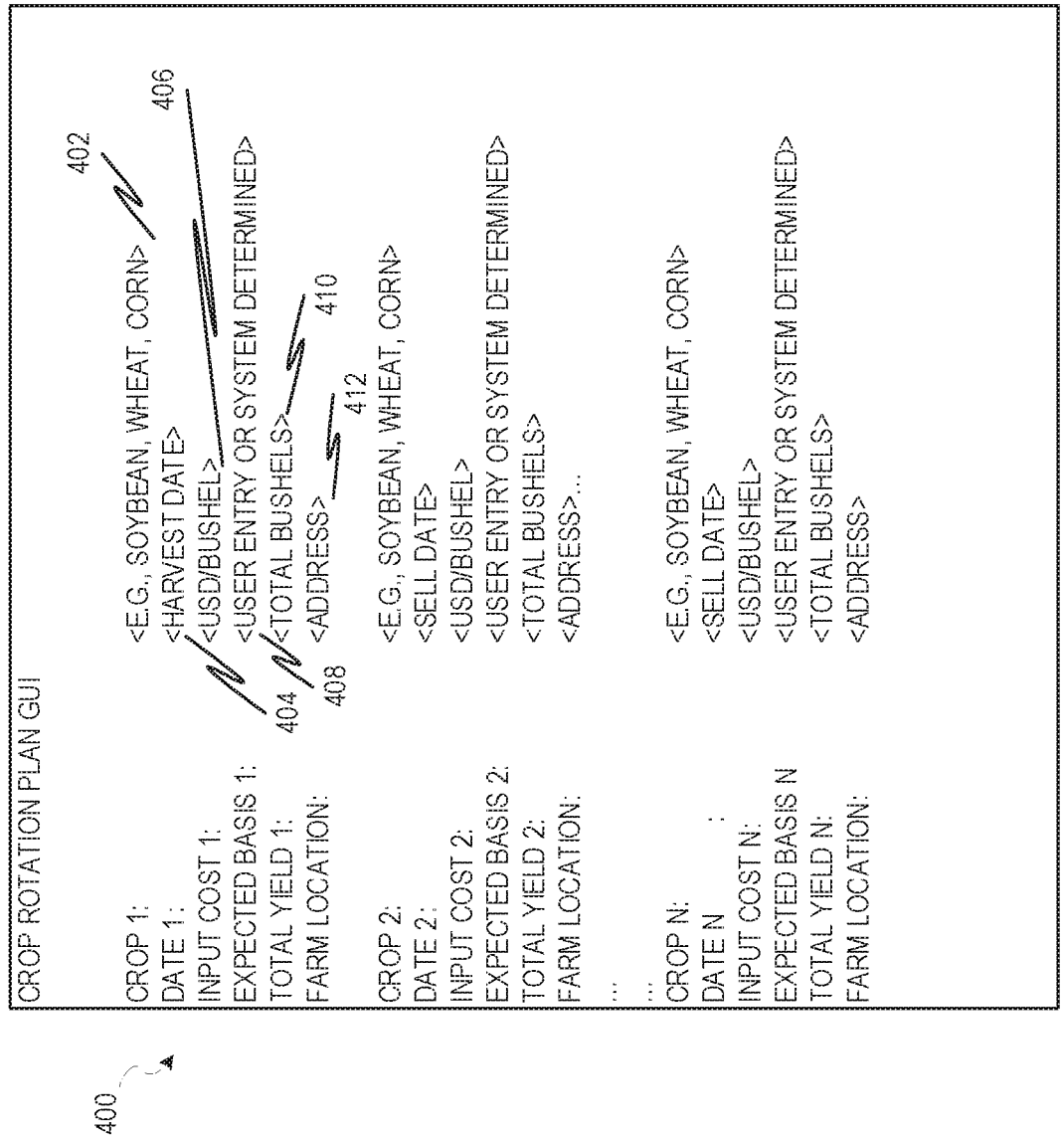
FIG. 4 is a screen capture illustrating an example user input screen in accordance with an example embodiment.
Figure 5:
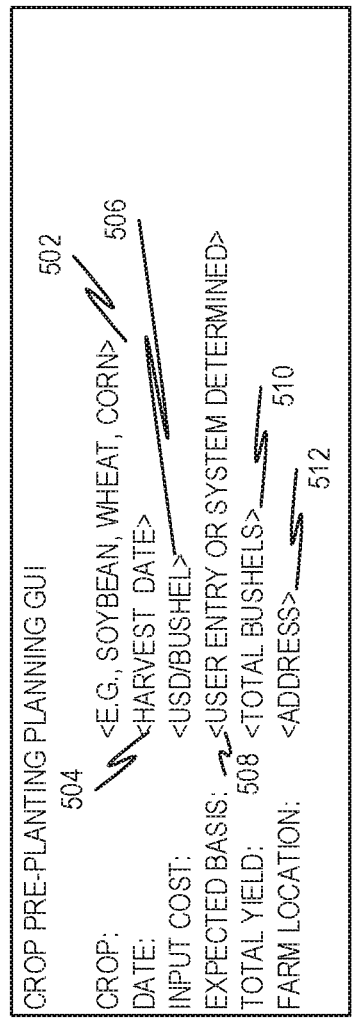
FIG. 5 is a screen capture illustrating another example user input screen in accordance with another example embodiment.

FIG. 4 is a screen capture illustrating an example user input screen 400 in accordance with an example embodiment. Here, the user is entering a crop rotation plan. Thus, for each of a plurality of different crops, a crop identification box 402 is provided for user entry. Also provided are boxes for a proposed sell date 404, input cost 406, expected basis 408 (which may be user entered or system determined after the user enters a location on a different screen), total yield 410, and farm location 412. Screen 400 represents an early planning exercise carried out by the farmer to identify the best crop rotation. The screen can be used by the farmer to try alternate crop rotation plans to identify a specific plan which results in the best farm income FIG. 5 is a screen capture illustrating another example user input screen 500 in accordance with another example embodiment. Here, the user is performing crop-pre-planting planning and it may also be used to verify if the ongoing crop rotation plan can be pursued. Boxes for the crop 502, sell date 504, input cost 506, expected basis 508 (which may be user entered or system determined after the user enters a location on a different screen), total yield 510, and farm location 512 are provided.

Figure 6:
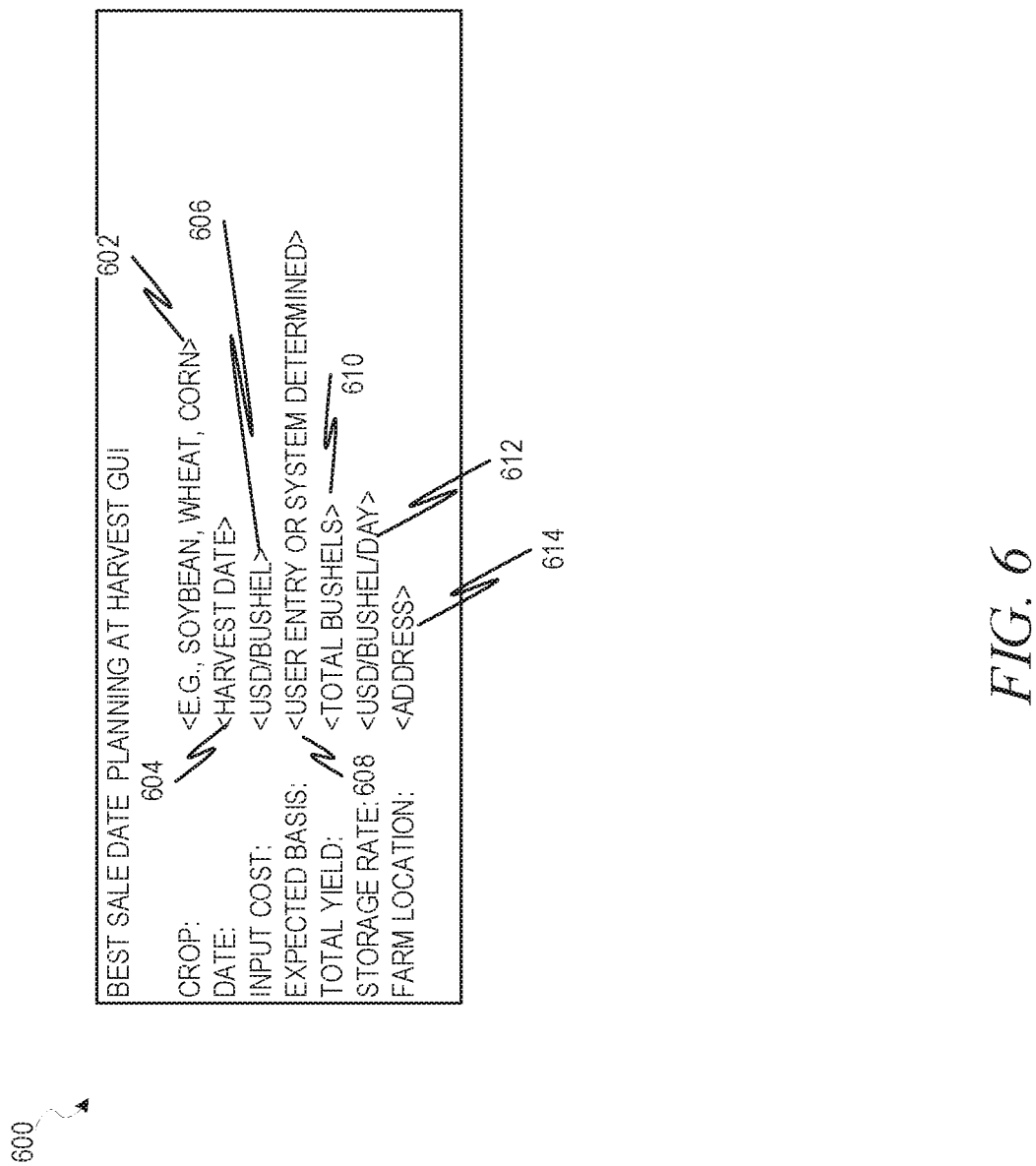
FIG. 6 is a screen capture illustrating another example user input screen in accordance with another example embodiment.

FIG. 6 is a screen capture illustrating another example user input screen 600 in accordance with another example embodiment. Here, the user is performing best sale date planning at harvest (based on specified harvest date). Boxes for the crop 602, harvest date 604, input cost 606, expected basis 608 (which may be user entered or system determined after the user enters a location on a different screen), total yield 610, storage rate 612, and farm location 614 are provided.

Figure 7:
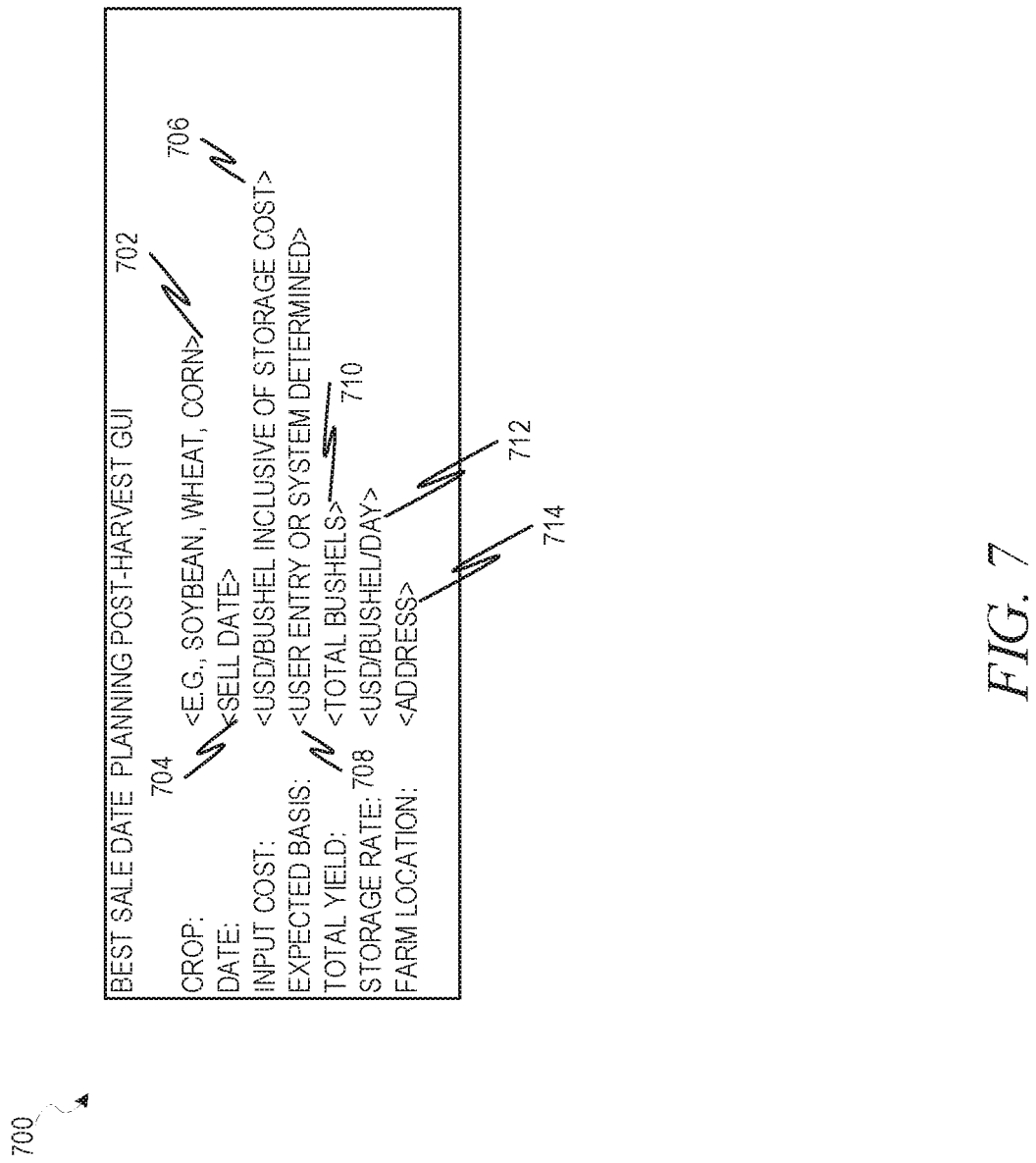
FIG. 7 is a screen capture illustrating another example user input screen in accordance with another example embodiment.

FIG. 7 is a screen capture illustrating another example user input screen 700 in accordance with another example embodiment. Here, the user is performing best sale date planning post-harvest. Boxes for the crop 702, sell date 704, input cost 706, expected basis 708 (which may be user entered or system determined after the user enters a location on a different screen), total yield 710, storage rate 712, and farm location 714 are provided. Since this is post-harvest computation, most likely the farmer already has the crop in storage. So box 706 for input cost may also include storage cost incurred thus far.

FIG. 8 is a screen capture illustrating an example output screen 800 in accordance with an example embodiment. Here, a table is depicted. A crop name column 802 may indicate a name of a crop and an elevator address column 804 may indicate an address of corresponding nearby elevator(s) potentially purchasing the crop. A best sale date column 806 may indicate a proposed best sale date for the crop at the corresponding elevator. A futures column 808 may indicate a forecast futures price for a corresponding crop and date in a range of dates. A basis price column 810 may indicate a forecast basis price for the corresponding crop, elevator and date. An input cost column 812 may display an input cost for the corresponding crop and a storage cost column 814 represents storage cost for the corresponding crop and date.

A total quantity column 816 may indicate a total yield for each crop. Finally, a crop earning column 818 may indicate the forecast earnings for the crop, corresponding elevator for each date.

The range of dates described above may be a range of dates that corresponds with best crop income. For "crop rotation planning" and "crop pre-planting planning" the date range will be around the date requested by the farmer. For other scenarios, the date range is determined by this application.

In view of the above described implementations of subject matter this application discloses the following list of examples, wherein one feature of an example in isolation or more than one feature of an example taken in combination and, optionally, in combination with one or more features of one or more further examples, are further examples also falling within the disclosure of this application.

EXAMPLES

Example 1. A system comprising:
   at least one hardware processor; and
   a non-transitory computer-readable medium storing instructions that, when executed by the at least one hardware processor, cause the at least one hardware processor to perform operations comprising:
     receiving an identification of an item and an identification of a distribution point for the item from a graphical user interface;
     obtaining price history data of prices paid for the item by the distribution point on a plurality of past dates;
     feeding the price history data into a first basis prediction machine learned model trained to forecast a basis price for a plurality of future dates based upon the price history data, the basis price being a difference between a national price for the item and a price paid by the distribution point for the item;
     obtaining a location for the distribution point;
     identifying one or more distribution points nearby the distribution point, based on criteria maintained by a rules framework;
     obtaining price history data of prices paid for the item by the one or more distribution points nearby the distribution point;
     feeding the price history data for the distribution point and the price history data of prices paid for the item by the one or more distribution points nearby the distribution point to a second basis prediction machine learned model trained to forecast the basis price for the plurality of future dates;

calculating a root mean square error for the first basis prediction machine learned model and the second basis prediction machine learned model and automatically selecting either the first basis prediction machine learned model or the second basis prediction machine learned model based upon which machine learned model has a lowest root mean square error; and computing an item earnings forecast by adding the basis price predicted by the selected machine learned model to a forecast item price and subtracting one or more costs.

Example 2. The system of Example 1, wherein the one or more costs include an input cost received from the graphical user interface.

Example 3. The system of Examples 1 or 2, wherein the one or more costs include a storage cost.

Example 4. The system of Example 3, wherein the item is a crop commodity and the storage cost is equal to a total yield of the crop commodity multiplied by a storage rate multiplied by a number of days projected for the crop commodity to remain in storage.

Example 5. The system of any of Examples 1-4, wherein the operations further comprise:

storing the computed root mean square errors in an application table of an in-memory database.

Example 6. The system of Example 5, wherein the automatically selecting is performed by a machine learned model trained to use errors of each individual model and the stored computed root mean square errors to identify a trend of a winning model.

Example 7. The system of any of Examples 1-6, wherein the operations further comprise:

obtaining, via the graphical user interface, a crop rotation plan, the crop rotation plan identifying a plurality of different crop commodities for a single plot of land and, for each of the plurality of different crop commodities, an identified harvest date; and displaying, for each of the plurality of different crop commodities in the crop rotation plan, the computed crop earnings forecast.

Example 8. A method comprising:

receiving an identification of an item and an identification of a distribution point for the item from a graphical user interface;

obtaining price history data of prices paid for the item by the distribution point on a plurality of past dates;

feeding the price history data into a first basis prediction machine learned model trained to forecast a basis price for a plurality of future dates based upon the price history data, the basis price being a difference between a national price for the item and a price paid by the distribution point for the item;

obtaining a location for the distribution point;

identifying one or more distribution points nearby the distribution point, based on criteria maintained by a rules framework;

obtaining price history data of prices paid for the item by the one or more distribution points nearby the distribution point;

feeding the price history data for the distribution point and the price history data of prices paid for the item by the one or more distribution points nearby the distribution point to a second basis prediction machine learned model trained to forecast the basis price for the plurality of future dates;

calculating a root mean square error for the first basis prediction machine learned model and the second basis prediction machine learned model and automatically selecting either the first basis prediction machine learned model or the second basis prediction machine learned model based upon which machine learned model has a lowest root mean square error; and computing an item earnings forecast by adding the basis price predicted by the selected machine learned model to a forecast item price and subtracting one or more costs.

Example 9. The method of Example 8, wherein the one or more costs include an input cost received from the graphical user interface.

Example 10. The method of Examples 8 or 9, wherein the one or more costs include a storage cost.

Example 11. The method of Example 10, wherein the item is a crop commodity and the storage cost is equal to a total yield of the crop commodity multiplied by a storage rate multiplied by a number of days projected for the crop commodity to remain in storage.

Example 12. The method of any of Examples 8-11, further comprising:

storing the computed root mean square errors in an application table of an in-memory database.

Example 13. The method of Example 12, wherein the automatically selecting is performed by a machine learned model trained to use errors of each individual model and the stored computed root mean square errors to identify a trend of a winning model.

Example 14. The method of any of Examples 8-13, wherein the operations further comprise:

obtaining, via the graphical user interface, a crop rotation plan, the crop rotation plan identifying a plurality of different crop commodities for a single plot of land and, for each of the plurality of different crop commodities, an identified harvest date; and displaying, for each of the plurality of different crop commodities in the crop rotation plan, the computed crop earnings forecast.

Example 15. A non-transitory machine-readable medium storing instructions which, when executed by one or more processors, cause the one or more processors to perform operations comprising:

receiving an identification of an item and an identification of a distribution point for the item from a graphical user interface;

obtaining price history data of prices paid for the item by the distribution point on a plurality of past dates;

feeding the price history data into a first basis prediction machine learned model trained to forecast a basis price for a plurality of future dates based upon the price history data, the basis price being a difference between a national price for the item and a price paid by the distribution point for the item;

obtaining a location for the distribution point;

identifying one or more distribution points nearby the distribution point, based on criteria maintained by a rules framework;

obtaining price history data of prices paid for the item by the one or more distribution points nearby the distribution point;

feeding the price history data for the distribution point and the price history data of prices paid for the item by the one or more distribution points nearby the distribution point to a second basis prediction machine learned model trained to forecast the basis price for the plurality of future dates;

calculating a root mean square error for the first basis prediction machine learned model and the second basis prediction machine learned model and automatically selecting either the first basis prediction machine learned model or the second basis prediction machine learned model based upon which machine learned model has a lowest root mean square error; and computing an item earnings forecast by adding the basis price predicted by the selected machine learned model to a forecast item price and subtracting one or more costs.

Example 16. The non-transitory machine-readable medium of Example 15, wherein the one or more costs include an input cost received from the graphical user interface.

Example 17. The non-transitory machine-readable medium of Examples 15 or 16, wherein the one or more costs include a storage cost.

Example 18. The non-transitory machine-readable medium of Example 17, wherein the item is a crop commodity and the storage cost is equal to a total yield of the crop commodity multiplied by a storage rate multiplied by a number of days projected for the crop commodity to remain in storage.

Example 19. The non-transitory machine-readable medium of any of Examples 15-18, wherein the operations further comprise:

storing the computed root mean square errors in an application table of an in-memory database.

Example 20. The non-transitory machine-readable medium of Example 19, wherein the automatically selecting is performed by a machine learned model trained to use errors of each individual model and the stored computed root mean square errors to identify a trend of a winning model.

Figure 9:
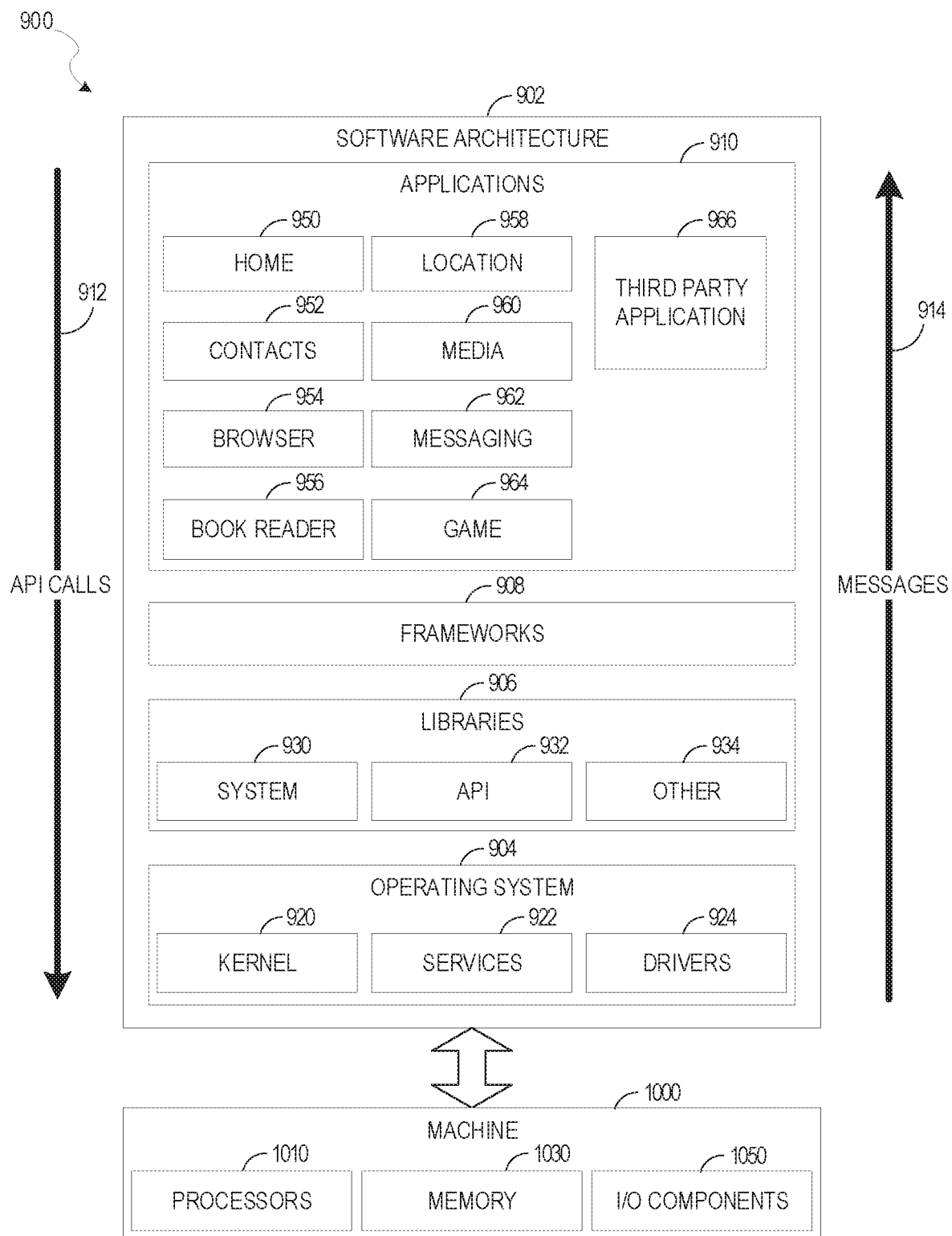
FIG. 9 is a block diagram illustrating an architecture of software, which can be installed on any one or more of the devices described herein.

FIG. 9 is a block diagram 900 illustrating a software architecture 902, which can be installed on any one or more of the devices described above. FIG. 9 is merely a non-limiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example architecture, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke API calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware, according to some embodiments. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910, according to some embodiments. For example, the frameworks 908 provide various graphical user interface (GUI) functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. According to some embodiments, the applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
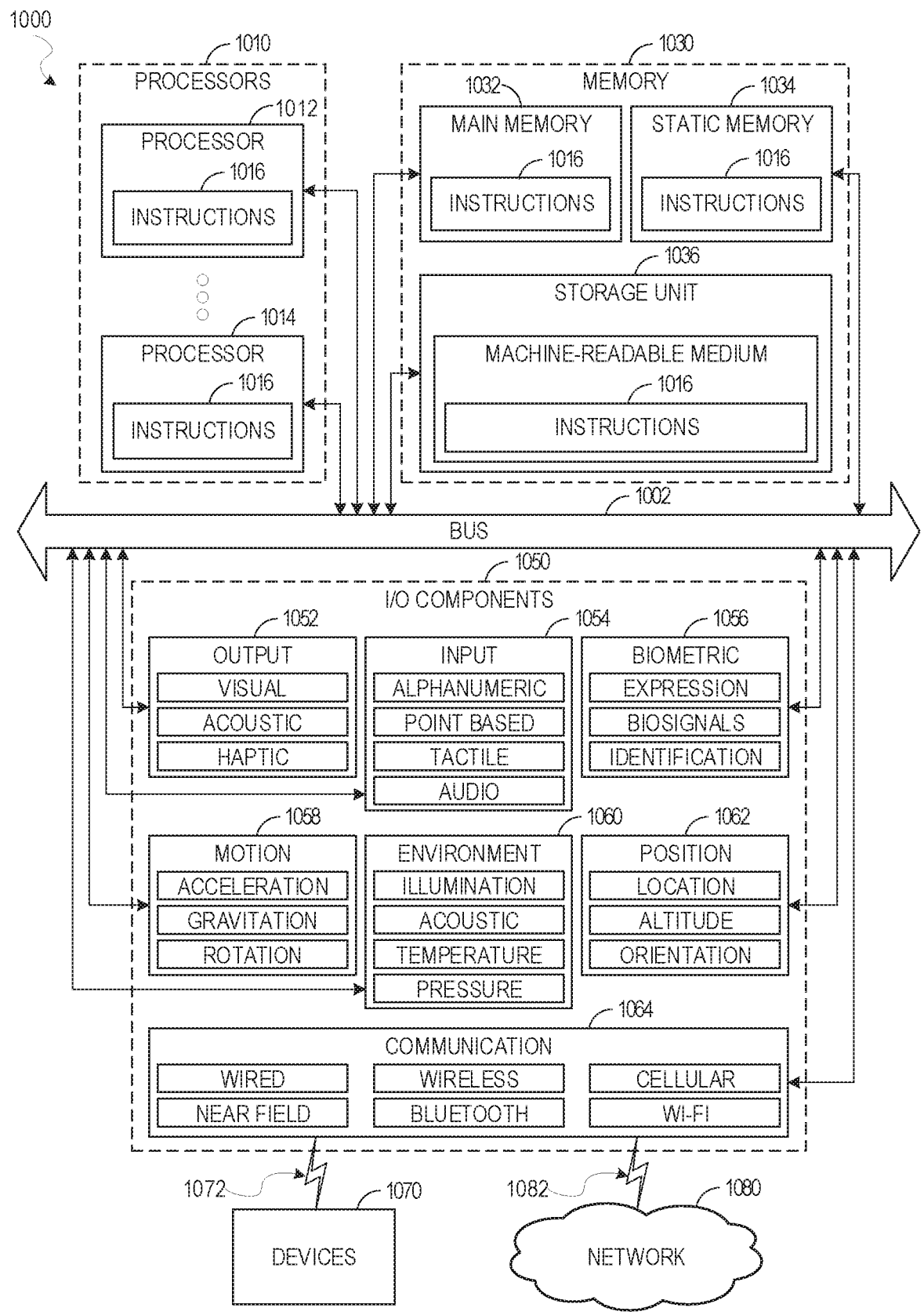
FIG. 10 illustrates a diagrammatic representation of a machine in the form of a computer system within which a set of instructions may be executed for causing the machine to perform any one or more of the methodologies discussed herein, according to an example embodiment.

FIG. 10 illustrates a diagrammatic representation of a machine 1000 in the form of a computer system within which a set of instructions may be executed for causing the machine 1000 to perform any one or more of the methodologies discussed herein, according to an example embodiment. Specifically, FIG. 10 shows a diagrammatic representation of the machine 1000 in the example form of a computer system, within which instructions 1016 (e.g., software, a program, an application, an applet, an app, or other executable code) for causing the machine 1000 to perform any one or more of the methodologies discussed herein may be executed. For example, the instructions 1016 may cause the machine 1000 to execute the methods of FIG. 3. Additionally, or alternatively, the instructions 1016 may implement FIGS. 1-8 and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1012, 1014 with a single core, multiple processors 1012, 1014 with multiple cores, or any combination thereof.

The memory 1030 may include a main memory 1032, a static memory 1034, and a storage unit 1036, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth.

The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., coupled via a USB).

Moreover, the communication components 1064 may detect identifiers or include components operable to detect identifiers. For example, the communication components 1064 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., HTTP). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a non-transitory computer-readable medium storing instructions that, when executed by the at least one hardware processor, cause the at least one hardware processor to perform operations comprising:
   receiving an identification of an item and an identification of a distribution point for the item from a graphical user interface;
   obtaining price history data of prices paid for the item by the distribution point on a plurality of past dates;
   feeding the price history data into a first basis prediction machine learned model trained to forecast a basis price for a plurality of future dates based upon the price history data, the basis price being a difference between a national price for the item and a price paid by the distribution point for the item;

obtaining a location for the distribution point;

identifying one or more distribution points nearby the distribution point, based on criteria maintained by a rules framework;

obtaining price history data of prices paid for the item by the one or more distribution points nearby the distribution point;

feeding the price history data for the distribution point and the price history data of prices paid for the item by the one or more distribution points nearby the distribution point to a second basis prediction machine learned model trained to forecast the basis price for the plurality of future dates;

calculating a root mean square error for the first basis prediction machine learned model and the second basis prediction machine learned model;

training a selection machine learned model using the root mean square error for the first basis prediction machine learned model, the root mean square error for the second basis prediction machine learned model, and a historical trend of a winning model between the first basis price prediction model and the second basis price prediction machine learned model;

automatically selecting either the first basis prediction machine learned model or the second basis prediction machine learned model based on a prediction made by the selection machine learned model; and computing an item earnings forecast by adding the basis price predicted by the selected machine learned model to a forecast item price and subtracting one or more costs.

2. The system of claim 1, wherein the one or more costs include an input cost received from the graphical user interface.

3. The system of claim 1, wherein the one or more costs include a storage cost.

4. The system of claim 3, wherein the item is a crop commodity and the storage cost is equal to a total yield of the crop commodity multiplied by a storage rate multiplied by a number of days projected for the crop commodity to remain in storage.

5. The system of claim 3, wherein the operations further comprise:
obtaining, via the graphical user interface, a crop rotation plan, the crop rotation plan identifying a plurality of different crop commodities for a single plot of land and, for each of the plurality of different crop commodities, an identified harvest date; and
displaying, for each of the plurality of different crop commodities in the crop rotation plan, the computed item forecast.

6. The system of claim 1, wherein the operations further comprise training the first basis machine learned model using historical data that includes seasonality.

7. The system of claim 1, wherein the operations further comprise:
storing the computed root mean square errors in an application table of an in-memory database.

8. A method comprising:
receiving an identification of an item and an identification of a distribution point for the item from a graphical user interface;
obtaining price history data of prices paid for the item by the distribution point on a plurality of past dates;

feeding the price history data into a first basis prediction machine learned model trained to forecast a basis price for a plurality of future dates based upon the price history data, the basis price being a difference between a national price for the item and a price paid by the distribution point for the item;

obtaining a location for the distribution point;

identifying one or more distribution points nearby the distribution point, based on criteria maintained by a rules framework;

obtaining price history data of prices paid for the item by the one or more distribution points nearby the distribution point;

feeding the price history data for the distribution point and the price history data of prices paid for the item by the one or more distribution points nearby the distribution point to a second basis prediction machine learned model trained to forecast the basis price for the plurality of future dates;

calculating a root mean square error for the first basis prediction machine learned model and the second basis prediction machine learned model;

training a selection machine learned model using the root mean square error for the first basis prediction machine learned model, the root mean square error for the second basis prediction machine learned model, and a historical trend of a winning model between the first basis price prediction model and the second basis price prediction machine learned model;

automatically selecting either the first basis prediction machine learned model or the second basis prediction machine learned model based on a prediction made by the selection machine learned model; and computing an item earnings forecast by adding the basis price predicted by the selected machine learned model to a forecast item price and subtracting one or more costs.

9. The method of claim 8, wherein the one or more costs include an input cost received from the graphical user interface.

10. The method of claim 8, wherein the one or more costs include a storage cost.

11. The method of claim 10, wherein the item is a crop commodity and the storage cost is equal to a total yield of the crop commodity multiplied by a storage rate multiplied by a number of days projected for the crop commodity to remain in storage.

12. The method of claim 11, further comprising:
obtaining, via the graphical user interface, a crop rotation plan, the crop rotation plan identifying a plurality of different crop commodities for a single plot of land and, for each of the plurality of different crop commodities, an identified harvest date; and
displaying, for each of the plurality of different crop commodities in the crop rotation plan, the item earnings forecast.

13. The method of claim 8, further comprising:
storing the computed root mean square errors in an application table of an in-memory database.

14. The method of claim 8, further comprising training the first basis machine learned model using historical data that includes seasonality.

15. A non-transitory machine-readable medium storing instructions which, when executed by one or more processors, cause the one or more processors to perform operations comprising:

receiving an identification of an item and an identification of a distribution point for the item from a graphical user interface;

obtaining price history data of prices paid for the item by the distribution point on a plurality of past dates;

feeding the price history data into a first basis prediction machine learned model trained to forecast a basis price for a plurality of future dates based upon the price history data, the basis price being a difference between a national price for the item and a price paid by the distribution point for the item;

obtaining a location for the distribution point;

identifying one or more distribution points nearby the distribution point, based on criteria maintained by a rules framework;

obtaining price history data of prices paid for the item by the one or more distribution points nearby the distribution point;

feeding the price history data for the distribution point and the price history data of prices paid for the item by the one or more distribution points nearby the distribution point to a second basis prediction machine learned model trained to forecast the basis price for the plurality of future dates;

calculating a root mean square error for the first basis prediction machine learned model and the second basis prediction machine learned model;

training a selection machine learned model using the root mean square error for the first basis prediction machine learned model, the root mean square error for the second basis prediction machine learned model, and a historical trend of a winning model between the first basis price prediction model and the second basis price prediction machine learned model;

automatically selecting either the first basis prediction machine learned model or the second basis prediction machine learned model based on a prediction made by the selection machine learned model; and computing an item earnings forecast by adding the basis price predicted by the selected machine learned model to a forecast item price and subtracting one or more costs.

16. The non-transitory machine-readable medium of claim 15, wherein the one or more costs include an input cost received from the graphical user interface.

17. The non-transitory machine-readable medium of claim 15, wherein the one or more costs include a storage cost.

18. The non-transitory machine-readable medium of claim 17, wherein the item is a crop commodity and the storage cost is equal to a total yield of the crop commodity multiplied by a storage rate multiplied by a number of days projected for the crop commodity to remain in storage.

19. The non-transitory machine-readable medium of claim 15, wherein the operations further comprise:

storing the computed root mean square errors in an application table of an in-memory database.

20. The non-transitory machine-readable medium of claim 15, wherein wherein the operations further comprise training the first basis machine learned model using historical data that includes seasonality.

* * * * *